United States Patent [19]

Roth

[11] 4,231,385
[45] Nov. 4, 1980

[54] PNEUMATIC CONTROLLER

[75] Inventor: Günther Roth, Solingen, Fed. Rep. of Germany

[73] Assignee: Sunvic Regler GmbH, Solingen-Wald, Fed. Rep. of Germany

[21] Appl. No.: 24,958

[22] Filed: Mar. 29, 1979

[51] Int. Cl.³ .......................................... G05D 16/00
[52] U.S. Cl. ...................................... 137/86; 137/85
[58] Field of Search ...................... 137/86, 84, 85, 82

[56] References Cited

U.S. PATENT DOCUMENTS

| 2,638,911 | 5/1953 | Griswold | 137/84 |
| 2,711,754 | 6/1955 | McKinney | 137/85 X |
| 2,755,812 | 7/1956 | Garnett | 137/85 |
| 2,985,183 | 5/1961 | Peatross | 137/86 |
| 3,169,402 | 2/1965 | Baker | 137/85 X |
| 3,661,164 | 5/1972 | Kreuter | 137/86 X |

Primary Examiner—Alan Cohan
Attorney, Agent, or Firm—Arthur E. Hoffman

[57] ABSTRACT

A housing has an internal opening or cavity within which is a body. Both the opening and body have a relatively large cylindrical median portion and two smaller cylindrical end portions. Three annular diaphragms interconnect the housing and the body and divide that portion of the remaining opening between the two into four gas pressure chambers. The two end chambers are connected through respective ports in the body to pressures representing commanded value and actual value respectively. The two central chambers are connected through respective ports in the body to pressures representing negative feedback and positive feedback respectively. A fifth port communicating with the negative feedback chamber serves as an output pressure port.

5 Claims, 2 Drawing Figures

PNEUMATIC CONTROLLER

The invention relates to a pneumatic controller, wherein the commanded value and the actual value as well as a positive and a negative feedback are represented by pressures and which provides an output value determining a final control quantity, comprising: a housing, a movable inner body, which is supported centrally within the housing by three diaphragms, the interior of the housing being divided by the diaphragms into four pressure chambers, of which a first one is exposed to a pressure representing the commanded value, a second one is exposed to a pressure representing the actual value and counteracting the pressure in the first chamber, a third one is exposed to a pressure effecting negative feedback and a fourth one is exposed to a pressure effecting positive feedback; a restricted air supply port and an output pressure port in communication with the third pressure chamber and an outlet nozzle, which is arranged to establish communication between the second pressure chamber and which cooperates with a baffle surface provided on the inner body.

In a prior art pneumatic controller of this type, the interior of the housing has generally cylindrical shape with a restriction in the middle in the form of an inwardly projecting flange. The inner body has generally cylindrical shape with outwardly projecting flanges at each end, whereby a spool-shaped structure is formed. Annular diaphragms extend between each of the outwardly projecting flanges of the inner body and the inner surface of the interior of the housing on both sides of the restriction. A third annular diaphragm extends between the inwardly projecting flange on the inner surface of the interior of the housing and the cylindrical median portion of the inner body. In this way the interior of the housing is divided into four chambers. An outlet nozzle is arranged in the end wall of the housing in front of the end face of the inner body and establishes communication between the pressure chamber formed there and atmosphere and is arranged to be covered more or less by the end face of the inner body. Furthermore an air supply port restricted by a flow restrictor opens into this pressure chamber. An output pressure port branches off behind this air supply port.

This prior art arrangement operates as controller as follows:

A pressure representing a commanded value w, for example a commanded temperature, is applied to the pressure chamber adjacent the last-mentioned pressure chamber and extending as annular chamber around the inner body. A pressure representing the actual value x is applied to the pressure chamber juxtaposed to this pressure chamber on the outer side of the median diaphragm. Eventually the pressure chamber which is defined in front of the end face of the inner body remote from the outlet nozzle is exposed to a pressure, which represents a positive feedback R+ becoming effective with an appropriate transfer function, whereby, for example, an integral action of the controller can be achieved. The output pressure port is connected to an actuator, for example to a diaphragm valve, which is arranged to affect the actual value x. Any deviation of the actual value x from the commanded value w causes a change of the output pressure, which represents a final control quantity y. The pressure in the pressure chamber containing the outlet nozzle represents a negative feedback.

In the state of control-equilibrium the pressures in the pressure chambers are equal in pairs. During the control operation, however, pressure differences between the pressure chambers will occur and will also become effective across the diaphragms. Therefore the diaphragms have to be able to take up this pressure difference. If, to this end, the diaphragms are made sufficiently thick and are even reinforced by a fabric, the free mobility of inner body and its regulating operation is impaired. Therefore it is known to provide a corrugation in each diaphragm. With such a structure, a hysteresis will be caused, when the pressure difference effective across the diaphragm changes its sign and therefore the corrugation jumps from one side to the other. Therefore, in a prior art pneumatic controller of this type, each diaphragm consists of two spaced washer-shaped parts, each of which forms a corrugation and which are stretched one above the other between the inner body and the housing. The intervening space between these parts is vented, whereby each of the corrugations projects always in the same direction independent of the sign of the pressure difference between the pressure chambers, namely towards the intervening space. Such an arrangement is very expensive.

A further problem is presented by the tolerances of the effective areas on which the pressures in the pressure chambers act on the inner body. When the diaphragm areas of the two parts of the "double diaphragm" are not exactly equal, a resultant force will act, which tends to move the inner body into one end position or the other. Therefore a spring is provided in the prior art pneumatic controller, the bias of said spring being adjustable. By adjusting this spring there is compensation for the resultant force caused by the area tolerances. This compensation is, however, only approximate, because, as can be shown, the error depends on the amount of the actual value.

In the prior art controller, the pressure chambers, to which the pressures causing a feedback are applied, are defined in front of the end faces of the inner body, while the pressure chamber for the pressures representing the commanded value w and the actual value x are formed as annular chambers. The maximum proportional band which can be set with such controllers is usually 500%. Therefore, in the prior art controller design, it is necessary that $$D^2/D^2 - d^2 = 5,$$

wherein D is the effective diameter of the large diaphragm and d is the effective diameter of the small diaphragm. This yields for the prior art arrangement a ratio of the diameters of $$\frac{D}{d} = \sqrt{\frac{5}{4}} = 1.118.$$

Such small diameter differences are only difficultly to be controlled with respect to their tolerances.

It is the object of the invention to construct a pneumatic controller of the type defined in the beginning such that the tolerances of the diaphragm areas have no or reduced influence on the operation of the controller.

According to the invention, the controller is characterized by the combination of the following features:
(a) The interior of the housing comprises a median section of greater diameter and, on both sides thereof, end sections having diameters, which are reduced as compared to the median section.

(b) The inner body has a median portion of increased cross section and end portions of reduced cross sections on both sides thereof, the median portion of the inner body being arranged within the median section of the interior of the housing, and the end portions of the inner body extending into the end sections of the interior of the housing.

(c) Annular diaphragms extend between each of the end portions of the inner body and the inner surface of the associated end section of the interior of the housing, and a third annular diaphragm extends between the median portion of the inner body and the inner surface of the median section of the interior of the housing.

(d) The first and second pressure chambers are defined in front of the respective end faces of the inner body, and the third and fourth pressure chambers extend annularly around the inner body and are separated from each other by the third annular diaphragm.

With a controller of this construction the ratio of the effective diaphragm diameters required for a proportional band of 500% is defined by $$D^2 - d^2/d^2 = 5,$$

which results in a diameter ratio of $$\frac{D}{d} = \sqrt{6} = 2.45.$$

With such a diameter ratio, tolerances of the diameters are less critical.

According to a further modification of the invention each of the diaphragms may be formed of one single, thin, washer-shaped element.

Thereby resultant forces are avoided which might be caused by the different effective areas of the two parts of the double diaphragm.

In order to permit taking up of pressure differences across the diaphragms without the problems discussed in the beginning with reference to the prior art, it is advantageous, that the washer-shaped element consists of elastomeric material without reinforcing filler members, and that the annular gaps defined between inner body and housing and bridged by the diaphragms have beveled edges on both sides of the diaphragms and are so narrow that the diaphragms, when they bulge out due to a pressure difference, will engage the beveled edges and will be supported against overload.

Zero adjustment may be permitted in that the outlet nozzle is axially adjustably mounted in the housing.

An embodiment of the invention will be described in greater detail hereinbelow with reference to the accompanying drawings.

Figure 1:
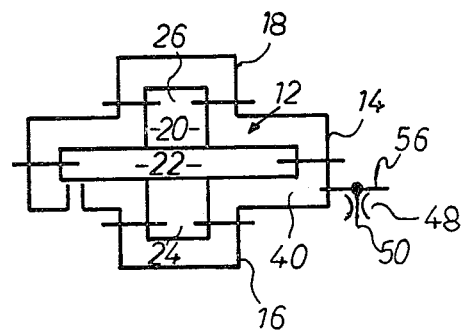
FIG. 1 shows schematically a controller constructed in accordance with the invention.

The housing 10 of the controller defines an interior or internal opening or cavity, generally 12 of the housing, which has a cylindrical median section 14 of enlarged cross section and, on both sides thereof, cylindrical end sections 16 and 18 of reduced cross section as compared to the median section 14. An inner body 20 is axially movably arranged within the interior 12 of the housing. This inner body 20 has a cylindrical or disc-shaped median portion 22 of larger cross section and, on both sides thereof, cylindrical end portions 24 and 26 of reduced cross section. The median portion 22 of the inner body 20 is located in the median section 14 of the interior 12 of the housing, and the end portions 24 and 26 of the inner body 20 extend into the end sections 16 and 18, respectively, of the interior 12 of the housing. Annular diaphragms 28,30 extend between each of the end portions 24 and 26, respectively of the inner body 20 and the inner surface of the associated end section 16 and 18, respectively, of the interior 12 of the housing. A third annular diaphragm 32 extends between the median portion 22 of the inner body 20 and the inner surface of the median section 14 of the interior 12 of the housing.

The diaphragms 28,30,32 divide the interior 12 of the housing into four pressure chambers. A first pressure chamber 34 is defined in front of the lower end face, as viewed in the Figures, of the inner body 20 within the end section 18 and is limited by the diaphragm 30. A second pressure chamber 36 is defined in front of the upper end face, as viewed in the Figures, of the inner body 20 within the end section 16 and is limited by the diaphragm 28. A third pressure chamber 40 extends annularly around the inner body between the diaphragms 28 and 32. A fourth pressure chamber 42 extends annularly around the inner body between the diaphragms 32 and 30.

Figure 2:
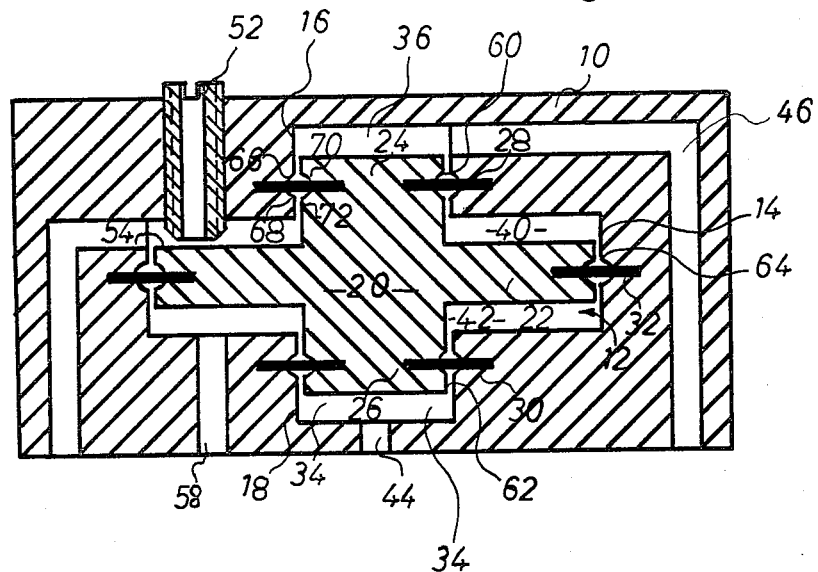
FIG. 2 is a sectional view of a constructional embodiment of the controller.

The first pressure chamber 34 is exposed through a port 44 to a pressure representing the commanded value w. The second pressure chamber 36 is exposed through a port 46 to a pressure representing the actual value x. This pressure acts on the inner body 20 towards the bottom in FIG. 2 and thus counteracts the pressure in the first pressure chamber, which pressure exerts a force on the inner body 20 acting towards the top in FIG. 2. A pressure, which causes a negative feedback $R^-$, prevails in the third pressure chamber 40. An air supply port 50 restricted through a flow restrictor 48 opens into the third pressure chamber 40. Furthermore, an outlet nozzle 52 extends into the third pressure chamber 40 and establishes communication between the third pressure chamber 40 and atmosphere. This outlet nozzle 52 cooperates with a baffle surface 54 provided on the inner body 20, said baffle surface being formed here by the end face of the median portion 22. An output pressure port 56, from which a pressure determining the final control quantity y is derived, communicates with the third pressure chamber 40 and with the air supply port 50 downstream of the flow restrictor 48. In this way, a pressure is generated within the third pressure chamber 40, said pressure being proportional to the final control quantity y and exerting a resultant force, directed to the bottom in FIG. 2, on the inner body 20, this force thus acting in the same direction as the pressure representing the commanded value x in the first pressure chamber. The outlet nozzle 52 is mounted axially adjustably in the housing 10 by means of a fine screw thread.

Eventually a pressure, which represents a positive feedback $R^+$, is applied to the fourth pressure chamber 42 through a port 58.

Each of the diaphragms 28,30,32 consists of a single, thin, washer-shaped part, the thickness of which may amount, for example, to 0.3 to 0.5 millimeters with a radial width of 1.6 millimeters. The washer-shaped parts consist of an elastomeric material without reinforcing filler members and are therefore highly flexible.

The annular gaps 60,62,64 defined between the inner body 20 and the housing 10 and bridged by the diaphragms 28,30,32 have beveled edges, for example 66,68,70 and 72 on both sides of the diaphragm and are so narrow, that the diaphragms 28,30,32, when they bulge out due to a pressure difference, will engage the beveled edges and will be supported against overload.

I claim:

1. A pneumatic controller wherein the commanded value and the actual value as well as a positive and a negative feedback are represented by pressures and which provides an output pressure value determining a final control quantity, comprising a housing defining an internal cavity and five ports communicating with said internal cavity, an inner body positioned in said internal cavity, and three spaced diaphragms interconnecting the housing and the body and supporting the body in said internal cavity for movement with respect to the housing, said diaphragms with said body dividing the internal cavity into four pressure chambers, a respective one of four of said ports communicating with each chamber respectively, a first of said chambers being exposed to a commanded value pressure through the respective port, a second of said chambers being exposed to an actual value pressure through the respective port and counteracting the pressure in the first chamber, a third of said chambers being exposed to a negative feedback pressure through the respective port, the fourth of said chambers being exposed to a positive feedback pressure through the respective port, the port communicating with said third chamber being a restricted air supply port and including an outlet nozzle in said third chamber, said body defining a baffle surface in said third chamber in juxtaposition to said outlet nozzle, the fifth of said ports being an output pressure port and communicating with said third chamber, said controller being characterized by the combination of the following features:

(a) said internal cavity having two ends and between said ends comprising a cylindrical median section and two cylindrical end sections at respective sides of the median section, said end sections being of diameters that are relatively small compared to the diameter of the median section;

(b) said internal body comprising a relatively large median portion in said median section and relatively small end portions each of which is in a respective end section;

(c) said three diaphragms being annular, a first of said diaphragms being in one end section and extending between the end portion therein and the body, a second of said diaphragms being in the other end section and extending between the end portion therein and the body, and the third of the diaphragms being in the median section and extending between the median portion and the body; and (d) said first chamber being between one of said ends and the diaphragm nearest thereto, said second chamber being between the other of said ends and the diaphragm nearest thereto, the third and fourth chambers being between the first and second chambers and being separated by the third diaphragm.

2. A pneumatic controller as set forth in claim 1, wherein each of said diaphragms is formed of a single, thin washer-shaped element.

3. A pneumatic controller as set forth in claim 2, wherein each washer-shaped element consists of elastomeric material without reinforcing filler members, within said internal cavity and at each of said diaphragms said housing and body having beveled edges in juxtaposition to, and at both sides of, the respective diaphragm, and the part of the internal cavity at each diaphragm being so narrow between the body and the housing that when the diaphragm bulges due to substantial pressure differences between the chambers separated by that diaphragm the diaphragm engages said beveled edges and is thereby supported against overload.

4. A pneumatic controller as set forth in claim 3, wherein said body includes a member which defines said air supply port and said outlet nozzle, said member being adjustable toward and away from said baffle surface.

5. A pneumatic controller as set forth in claim 1, wherein said body includes a member which defines said air supply port and said outlet nozzle, said member being adjustable toward and away from said baffle surface.

* * * * *